US007201862B2

(12) United States Patent
Endo et al.

(10) Patent No.: US 7,201,862 B2
(45) Date of Patent: Apr. 10, 2007

(54) METHOD OF THE PRODUCTION OF A GOLF BALL

(75) Inventors: Seiichiro Endo, Kobe (JP); Takahiro Sajima, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 0 days.

(21) Appl. No.: 10/910,310

(22) Filed: Aug. 4, 2004

(65) Prior Publication Data

US 2005/0046071 A1    Mar. 3, 2005

(30) Foreign Application Priority Data

Aug. 29, 2003  (JP)  ............... 2003-306309

(51) Int. Cl.
     *B29C 37/02*   (2006.01)
(52) U.S. Cl. ............... 264/161; 264/162; 264/320
(58) Field of Classification Search ............... 264/161, 264/162, 320; 473/383
     See application file for complete search history.

(56) References Cited

U.S. PATENT DOCUMENTS 5,090,705 A    2/1992   Oka et al.

5,338,039 A *  8/1994   Oka et al. ............... 473/384
5,356,150 A * 10/1994   Lavallee et al. ........... 473/383
6,620,060 B2 *  9/2003   Ogg et al. ............... 473/377
6,981,927 B2 *  1/2006   Aoyama .................. 473/378

FOREIGN PATENT DOCUMENTS

JP         60-232861 A    11/1985

* cited by examiner

*Primary Examiner*—Edmund H. Lee
(74) *Attorney, Agent, or Firm*—Birch Stewart Kolasch & Birch, LLP

(57) ABSTRACT

A ball body is formed with a mold having upper and lower mold half. Dimples 16 having a shape inverted from the shape of the pimples of the mold are formed on the ball body. The dimples 16 in the vicinity of the equatorial line have a size in the meridional direction D1 being greater than a size in the latitudinal direction D2. The difference between the size in the meridional direction D1 and the size in the latitudinal direction D2 is 0.01 mm or greater and 0.50 mm or less. By grinding the ball body in the vicinity of the equatorial line, a flash generated on the seam resulting form the mold is removed. According to the grinding, the size in the meridional direction of the dimple 16 is reduced, and thus, plane shape of the dimple becomes closer to a perfect circle.

2 Claims, 11 Drawing Sheets

METHOD OF THE PRODUCTION OF A GOLF BALL

This application claims priority on Patent Application No. 2003-306309 filed in Japan on Aug. 29, 2003.

BACKGROUND OF THE INVENTION

1. Field of the Invention

The present invention relates to method of the production of a golf ball having dimples on the surface thereof.

2. Description of the Related Art

For the formation of a golf ball, injection molding or compression molding has been employed. In either case, a mold having upper and lower mold half having a hemispheric cavity is used. Upon formation, material for the molding leaks outside from the parting line between the upper and lower mold half. Due to this leakage, a ring-shaped flash is generated in the part corresponding to the parting line (hereinafter, referred to as "seam") on the surface of the ball body. Although a gate is provided on the parting line of the mold for the injection molding, a flash is also generated in the part corresponding to this gate. These flashes need to be removed.

The flash is removed by bringing the flash into contact with a grinding device while rotating the ball body. Examples of the grinding device for use include sand belts, whetstone, sand paper and the like. Such procedures of removal are disclosed in JP-A No. 60-232861.

Golf balls have numerous dimples on the surface thereof. A role of the dimples involves causing turbulent flow separation through disrupting the air flow around the golf ball during the flight. By causing the turbulent flow separation, a separating point of air from the golf ball shifts backwards leading to the reduction of a drag coefficient (Cd). The turbulent flow separation promotes the differentia between the separating points at the upper and lower sides of the golf ball, which result from the backspin, thereby enhancing the lift force that acts upon the golf ball. Flight distance of the golf ball is prolonged on behalf of the reduced drag and enhanced lift force.

FIG. 9 is a cross sectional view illustrating a part of a ball body 2 after the molding. What is indicated by a chain double-dashed line E in FIG. 9 is an equatorial line. This equatorial line E corresponds to a parting line. A flash 4 is generated on the equatorial line E. What is indicated by a reference numeral 6 in FIG. 9 is a dimple which is positioned in the vicinity of the equatorial line E.

FIG. 10 is a cross sectional view illustrating a golf ball 8 obtained from the ball body 2 shown in FIG. 9. This golf ball 8 is obtained by grinding/removing the flash 4 from the ball body 2. Along with the grinding of the flash 4, a part of the ball body 2 is also cut away. What is indicated by a chain double-dashed line M in FIG. 10 is the ball body 2 prior to the grinding. In light of being affected by the grinding, the vicinity of the equatorial line E of the golf ball 8 is a specific region. A golf ball having dimples with considered specificity in the vicinity of the equatorial line E is disclosed in U.S. Pat. No. 5,090,705.

FIG. 11 is a front view illustrating a dimple 6 of the golf ball 8 shown in FIG. 10. According to the grinding, the edge on the side of the equatorial line E of the dimple 6 shifts from the position indicated by a double-dashed line to the position indicated by a solid line. In other words, the dimple 6 is deformed according to the grinding. The deformation causes deterioration of the appearance of the golf ball 8. The deformation may adversely affect the aerodynamic properties of the golf ball 8.

An object of the present invention is to provide a method of the production in which a golf ball that is excellent in appearance is obtained.

SUMMARY OF THE INVENTION

A method of the production of a golf ball according to the present invention comprises:

a molding step in which a ball body having dimples with a size in the meridional direction being greater than a size in the meridional direction, in the vicinity of the equatorial line, is formed with a mold; and a removing step in which a flash generated on a seam resulting from the mold is removed along with reduction of a size in the latitudinal direction of the dimple, through grinding the vicinity of the equatorial line. According to this method of the production, the dimples come to have a suitable shape on behalf of the deformation accompanied by grinding of the flash. The golf ball obtained according to this procedure is excellent in appearance.

Preferably, the difference between the size in the meridional direction and the size in the latitudinal direction of the dimples obtained in the molding step is 0.01 mm or greater and 0.50 mm or less. Preferably, the dimples obtained in the molding step have a shape in which the in-depth direction is different from the normal direction of the ball body. Preferably, an angle of the in-depth direction to the normal direction of the ball body is 0.2° or greater and 2.0° or less.

DESCRIPTION OF THE PREFERRED EMBODIMENTS

The present invention is hereinafter described in detail with appropriate references to the accompanying drawing, according to the preferred embodiments of the present invention.

Figure 1:
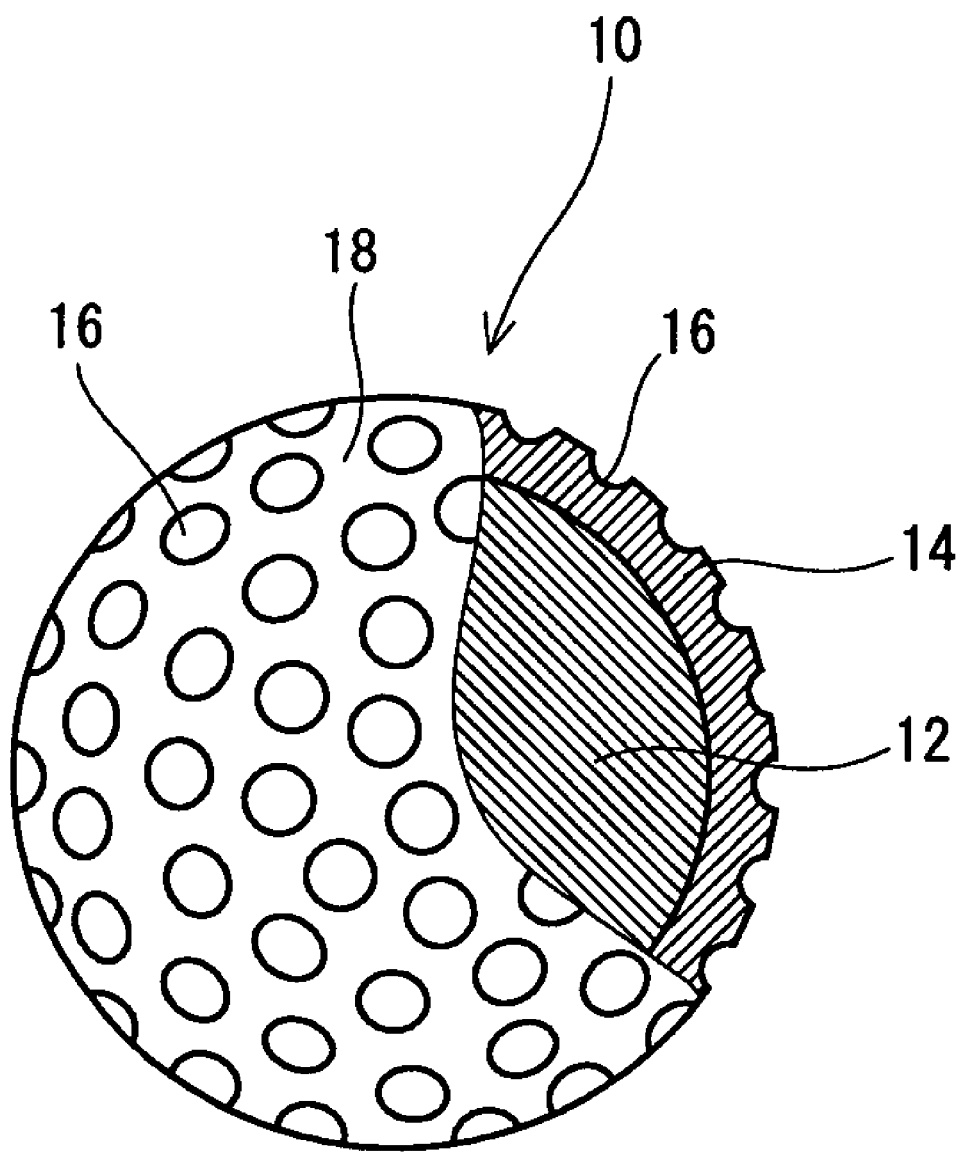
FIG. 1 is a schematic cross sectional view illustrating a golf ball obtained by a method of the production according to one embodiment of the present invention.

A golf ball 10 depicted in FIG. 1 has a spherical core 12 and a cover 14. Numerous dimples 16 are formed on the surface of the cover 14. Of the surface of the golf ball 10, a region other than the dimples 16 is a land 18. This golf ball 10 has a paint layer and a mark layer on the outside of the cover 14, although not shown in the Figure.

This golf ball 10 has a diameter of from 40 mm to 45 mm. From the standpoint of conformity to a rule defined by United States Golf Association (USGA), the diameter is preferably equal to or greater than 42.67 mm. In light of reduction of the air resistance, the diameter is preferably equal to or less than 44 mm, and more preferably equal to or less than 42.80 mm. Weight of this golf ball 10 is 40 g or greater and 50 g or less. In light of attainment of great inertia, the weight is preferably equal to or greater than 44 g, and particularly preferably equal to or greater than 45.00 g. From the standpoint of conformity to a rule defined by USGA, the weight is preferably equal to or less than 45.93 g.

The core 12 is formed through crosslinking of a rubber composition. Illustrative examples of the base rubber for use in the rubber composition include polybutadienes, polyisoprenes, styrene-butadiene copolymers, ethylene-propylene-diene copolymers and natural rubbers. Two or more kinds of the rubbers may be used in combination. In light of the resilience performance, polybutadienes are preferred, and particularly, high cis-polybutadienes are preferred.

For crosslinking of the core 12, a co-crosslinking agent is usually used. Preferable examples of the co-crosslinking agent in light of the resilience performance include zinc acrylate, magnesium acrylate, zinc methacrylate and magnesium methacrylate. In the rubber composition, an organic peroxide may be preferably blended together with the co-crosslinking agent. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide.

Various kinds of additives such as a filler, sulfur, an anti-aging agent, a coloring agent, a plasticizer, a dispersant and the like may be blended at an appropriate amount to the rubber composition as needed. Crosslinked rubber powder or synthetic resin powder may be blended to the rubber composition.

The core 12 has a diameter of 30.0 mm or greater and 42.0 mm or less, and particularly of 38.0 mm or greater and 41.5 mm or less. The core 12 may be composed of two or more layers.

The cover 14 is formed from a synthetic resin composition. Illustrative examples of the base resin for use in the cover 14 include ionomer resins, thermoplastic styrene elastomers, thermoplastic polyurethane elastomers, thermoplastic polyamide elastomers, thermoplastic polyester elastomers and thermoplastic polyolefin elastomers.

An appropriate amount of a coloring agent, a filler, a dispersant, an antioxidant, an ultraviolet absorbent, a light stabilizer, a fluorescent agent, a fluorescent brightening agent or the like may be blended to the cover 14 as needed. For the purpose of adjusting the specific gravity, powder of a highly dense metal such as tungsten, molybdenum or the like may be blended to the cover 14.

The cover 14 has a thickness of 0.3 mm or greater and 6.0 mm or less, and particularly of 0.6 mm or greater and 2.4 mm or less. The cover 14 may be composed of two or more layers.

The dimple 16 has a diameter of 2.0 mm or greater and 8.0 mm or less, and particularly of 2.5 mm or greater and 7.0 mm or less. Depth measured from a phantom spherical face to the deepest part of the dimple 16 is 0.15 mm or greater and 0.50 mm or less, and particularly of 0.20 mm or greater and 0.40 mm or less. Total volume of the parts surrounded by the phantom spherical face and the dimples 16 is 300 $mm^3$ or greater and 700 $mm^3$ or less, still more 350 $mm^3$ or greater and 650 $mm^3$ or less, and particularly 350 $mm^3$ or greater and 600 $mm^3$ or less. Proportion of total surface area of the dimples 16 occupied in the area of the phantom spherical face is 65% or greater and 90% or less, and particularly 75% or greater and 85% or less. Total number of the dimples 16 is 200 or greater and 500 or less, and particularly 220 or greater and 450 or less.

Figure 2:
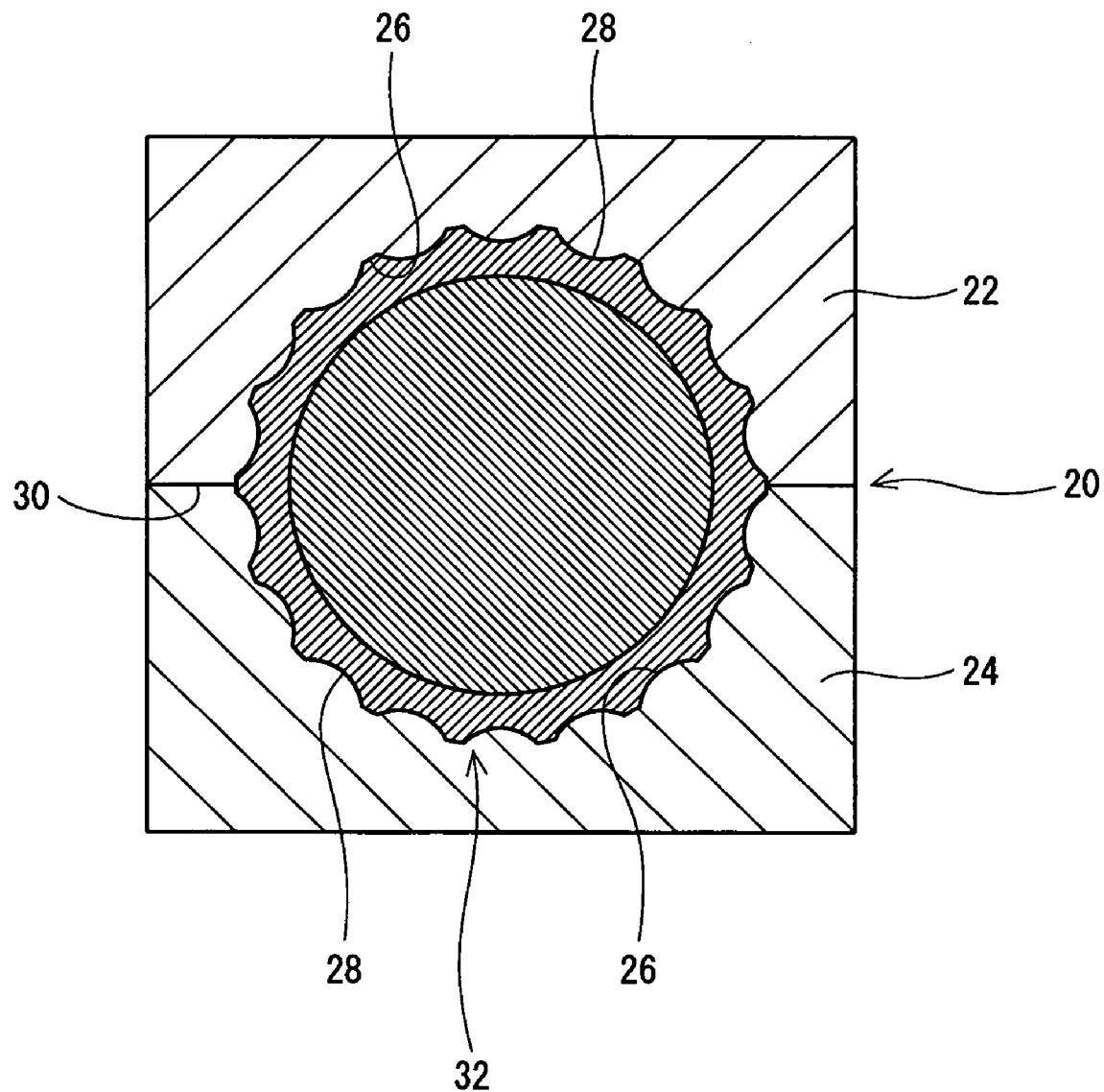
FIG. 2 is a cross sectional view illustrating a mold for the golf ball shown in FIG. 1.

FIG. 2 is a cross sectional view illustrating a mold 20 for the golf ball 10 shown in FIG. 1. This mold 20 has an upper mold half 22 and a lower mold half 24. These upper mold half 22 and lower mold half 24 have a hemispherical cavity face 26. Numerous pimples 28 are formed on the cavity face 26. A spherical cavity is formed through bringing the upper mold half 22 into contact with the lower mold half 24. The uppermost end and the lowermost end of the spherical cavity correspond to poles of a globe. Latitude of the pole is 90°. Parting line 30 between the upper mold half 22 and the lower mold half 24 corresponds to an equatorial line of the globe. Latitude of the equatorial line is zero.

Upon formation, injection molding or compression molding is employed. For the injection molding, a spherical core 12 is first obtained by crosslinking of a rubber composition. Next, this core 12 is placed into the mold 20, and the mold 20 is closed. Then, this core 12 is retained at the center of the cavity with a support pin which is not shown in the Figure. Next, a molten resin composition is injected through a gate, which is not shown in the Figure, into a space between the cavity face 26 and the core 12. This resin composition is hardened to form the cover 14. Next, the mold 20 is opened, and the ball body 32 is taken out from the mold 20. The ball body 32 has numerous dimples 16 on its surface. The dimple 16 has a shape inverted from the shape of the pimple 28.

For the compression molding, a spherical core 12 is first obtained by crosslinking of a rubber composition. On the other hand, half shells consisting of a resin composition are formed. Next, the core 12 is covered by two half shells. Then, the core 12 and the half shells are placed into the mold 20, and the mold 20 is closed. Next, the resin composition is molten and flows through the heat provided from the mold 20. This resin composition is hardened to form the cover 14. Next, the mold 20 is opened, and the ball body 32 is taken out from the mold 20. The ball body 32 has numerous dimples 16 on its surface. The dimple 16 has a shape inverted from the shape of the pimple 28.

In both cases of injection molding and compression molding, the molten resin composition leaks out from the parting line 30 between the upper mold half 22 and the lower mold half 24. A circular flash is generated on the seam of the ball body by the leaked resin composition. The flash is grind and removed.

Figure 3:
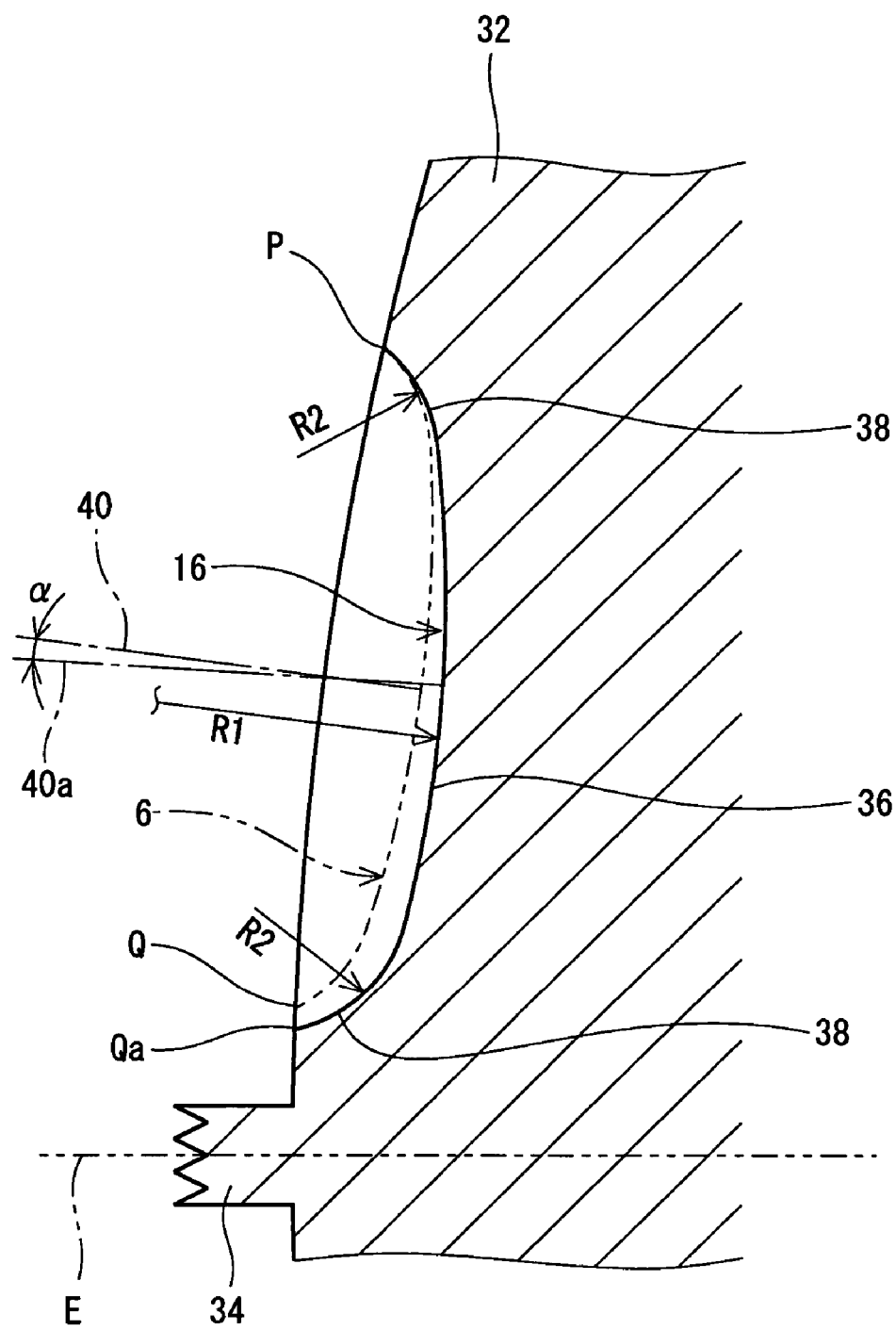
FIG. 3 is a cross sectional view illustrating a part of a ball body obtained with the mold shown in FIG. 2.

FIG. 3 is a cross sectional view illustrating a part of the ball body 32 after the molding. What is indicated by a chain double-dashed line E in FIG. 3 is an equatorial line. This equatorial line E corresponds to the parting line 30. A flash 34 is generated on the equatorial line E. The dimple 16 shown in FIG. 3 is positioned in the vicinity of the equatorial line E. A cross sectional shape of this dimple 16 is constituted from a circular arc 36 in the vicinity of the bottom and a circular arc 38 in the vicinity of the edge that follows on this circular arc 36. The circular arc 36 in the vicinity of the bottom and the circular arc 38 in the vicinity of the edge are smoothly joined subsequently. Curvature radius of the circular arc 36 in the vicinity of the bottom is R1, and the curvature radius of the circular arc in the vicinity of the edge is R2. This dimple 16 is what is called a double radius dimple.

In FIG. 3, a conventional dimple 6 is depicted with a chain double-dashed line for the purpose of the comparison. The plane shape of this dimple 6 is circular. According to the conventional dimple 6, a line of in-depth direction 40 (a line that orthogonally crosses with this circular arc at the center of the circular arc in the vicinity of the bottom) agrees with a normal line of the ball body 32.

Dimple 16 has a shape provided by rotating a conventional dimple 6 around the uppermost point P having the highest latitude as a center of the rotation, and extending the circular arc 38 to have the same curvature radius as R2. Direction of the rotation is a direction resulting in reduced inclination of the line of the in-depth direction 40 to the equatorial line E. The line of the in-depth direction after the rotation 40a inclines toward the line of the in-depth direction prior to the rotation 40 (also being a normal line of the ball body 32). The angle of inclination is α. According to the rotation, the lowermost end Q of the dimple 16 shifts to the point Qa. The dimple 16 provided by the rotation has a greater size in the meridional direction (distance in the substantially vertical direction in FIG. 3) in comparison with that in the conventional dimple 6. This dimple 16 has the size in the meridional direction being greater than the size in the latitudinal direction (distance in the horizontal direction on the paper of FIG. 3). This dimple 16 is vertically long.

The mold 20 is manufactured by transferring a master mold. The master mold has numerous dimples on the surface thereof. For forming this dimple, a cutting device (end mill, electrode for electric discharge machining or the like) is used. As described above, the dimple 16 on the ball body 32 has a shape inverted from the shape of the pimple 28 of the mold 20. On the other hand, the pimple 28 of the mold 20 has a shape inverted from the shape of the dimple of the master mold. In other words, the shape of the dimples 16 of the ball body 32 reflects the shape of the dimples of the master mold. By inclining the axial direction of the cutting device for the master mold, a dimple 16 having a shape as shown in FIG. 3 is obtained. The angle of inclination of the cutting device is α.

Figure 4:
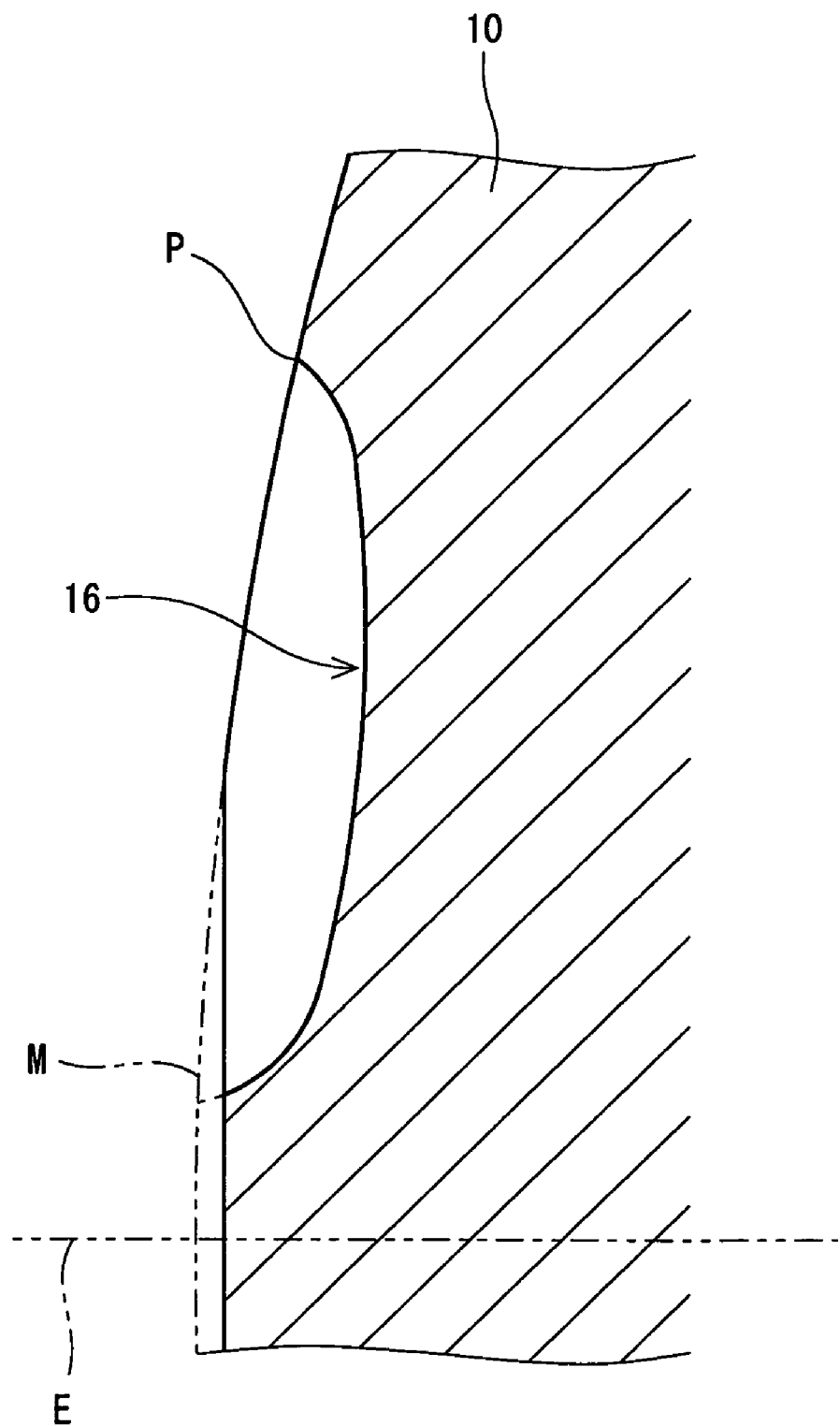
FIG. 4 is a cross sectional view illustrating a golf ball obtained from the ball body shown in FIG. 3.

FIG. 4 is across sectional view illustrating a golf ball 10 obtained from the ball body 32 shown in FIG. 3. This golf ball 10 is obtained by grinding/removing the flash 34 from the ball body 32. Along with the grinding of the flash 34, the ball body 32 in the vicinity of the equatorial line E is also cut away. What is indicated by a chain double-dashed line M in FIG. 4 is the ball body 32 prior to the grinding.

Figure 5:
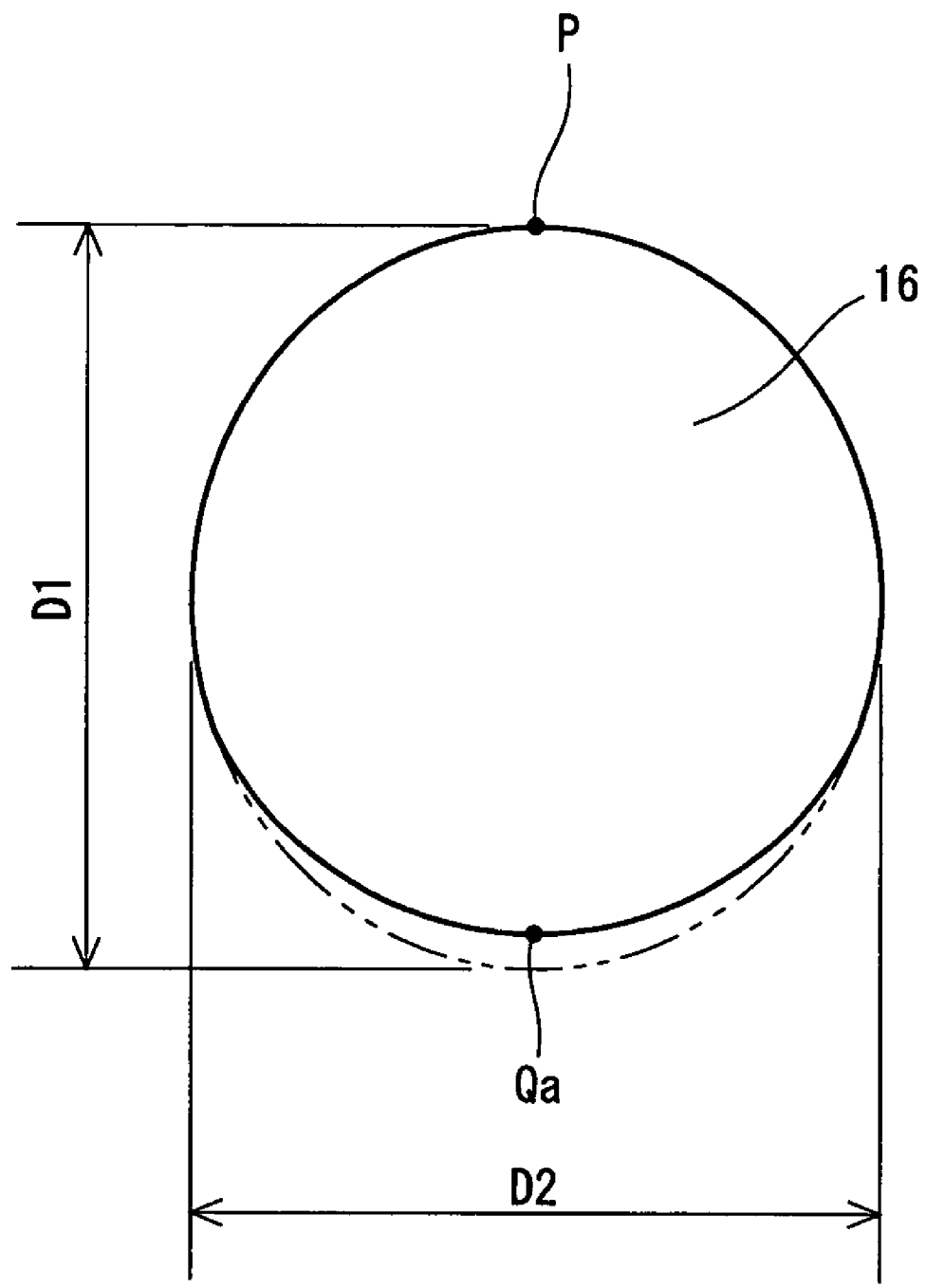
FIG. 5 is a front view illustrating a dimple of the golf ball shown in FIG. 4.
Figure 10:
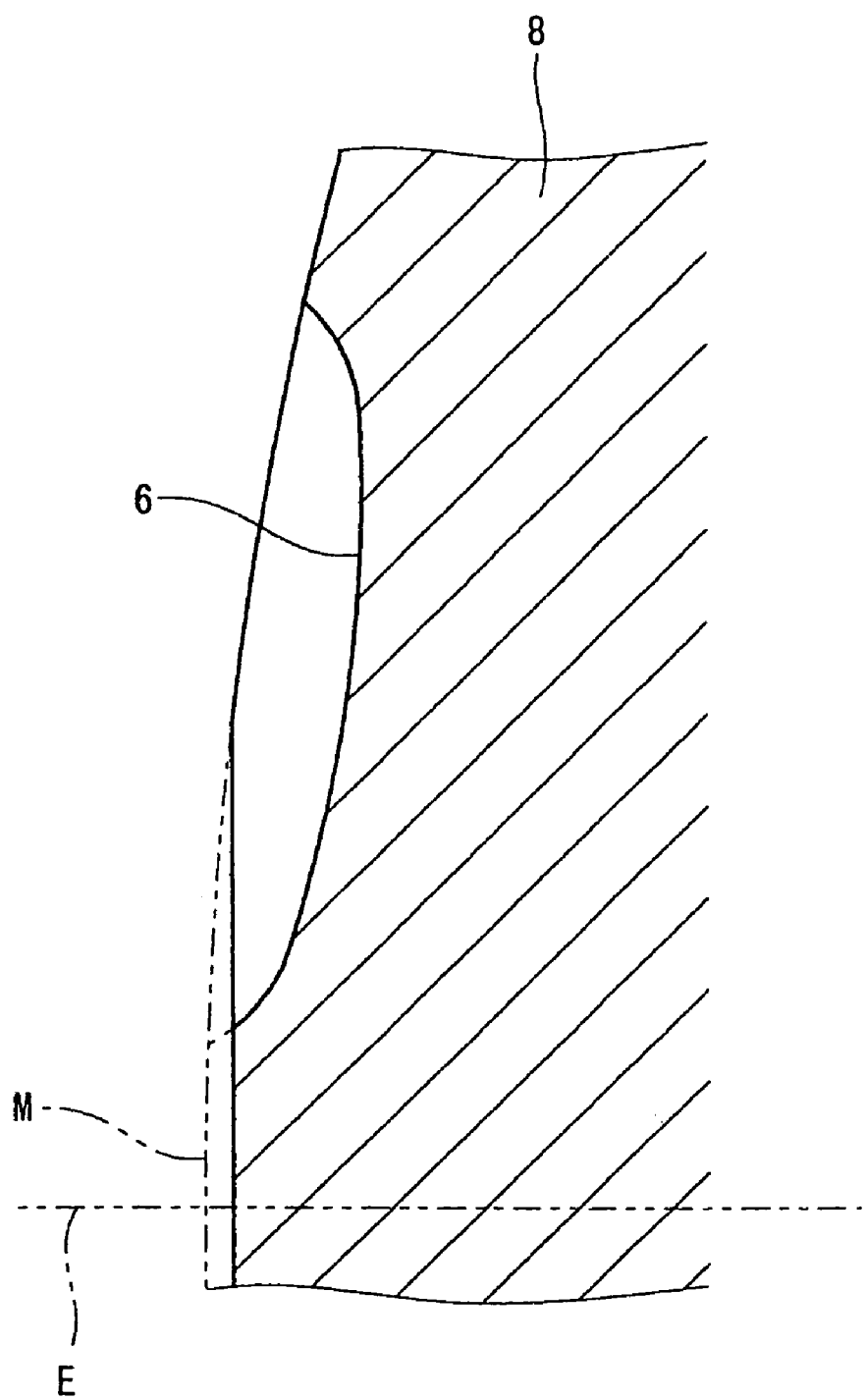
FIG. 10 is a cross sectional view illustrating a golf ball obtained from the ball body shown in FIG. 9.
Figure 11:
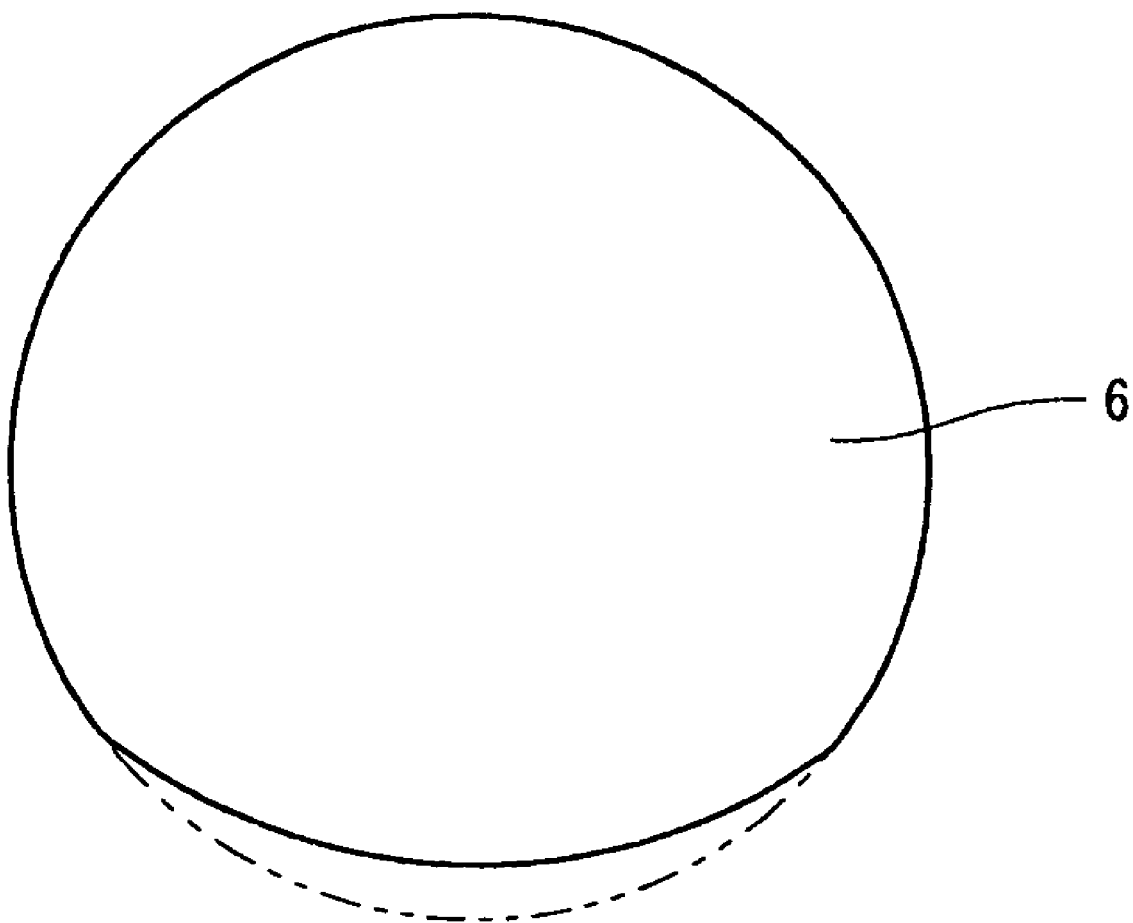
FIG. 11 is a front view illustrating a dimple of the golf ball shown in FIG. 10.

FIG. 5 is a front view illustrating a dimple 16 of the golf ball 10 shown in FIG. 4. In this FIG. 5, the vertical direction is the meridional direction, whilst the horizontal direction is the latitudinal direction. According to the grinding, the edge on the side of the equatorial line E of the dimple 16 shifts from the position indicated by a double-dashed line to the position indicated by a solid line. In other words, grinding results in reduction of the size in the meridional direction. Because the dimple 16 prior to the grinding is vertically long as described above, plane shape of the dimple 16 becomes closer to a perfect circle through reducing the size in the meridional direction. The shape of the dimple 16 indicated by the solid line in FIG. 5 is more like a perfect circle than the shape of the dimple 6 indicated by the solid line in FIG. 10. This golf ball 10 is excellent in appearance.

The "dimple in the vicinity of the equatorial line" herein means a dimple of which degree of latitude at its center is equal to or less than 15°. Ratio R represented by the following formula is preferably equal to or greater than 30%, more preferably equal to or greater than 60%, and particularly preferably equal to or greater than 90%.

$$R=(N2/N1)\cdot 100$$

wherein N1 represents the number of dimples that have the degree of latitude at its center of equal to or less than 15°, and that do not cross with the equatorial line E at the center in the stage prior to the grinding; and N2 represents the number of the dimples that have the degree of latitude at its center of equal to or less than 15°, have a size in the meridional direction being greater than a size in the latitudinal direction in the stage prior to grinding, and that do not cross with the equatorial line E at the center in the stage prior to the grinding. The ratio R is ideally 100%.

Also with dimples 16 that cross with the equatorial line E, deterioration of the appearance due to grinding can be prevented through setting the size in the meridional direction to be greater than the size in the latitudinal direction in the stage prior to the grinding. In instances of the dimple 16 with the center thereof positioned on the equatorial line E, the size in the meridional direction and the size in the latitudinal direction shall be set to be equal.

The angle of inclination α of the line of the in-depth direction 40a to the normal line of the ball body 32 is preferably 0.2° or greater and 2.0° or less. When the angle of inclination α is less than the above range, deterioration of the appearance resulting from the deformation of the dimple 16 caused by grinding becomes remarkable. In this respect, the angle of inclination α is more preferably equal to or greater than 0.3°, and particularly preferably equal to or greater than 0.5°. When the angle of inclination α is beyond the above range, the appearance may become unsatisfactory due to the size in the meridional direction being greater than the size in the latitudinal direction also after the grinding. In this respect, the angle of inclination α is more preferably equal to or less than 1.5°, and particularly preferably equal to or less than 1.0°.

Difference between the size in the meridional direction D1 and the size in the latitudinal direction D2 in the stage prior to the grinding (D1−D2) is 0.01 mm or greater and 0.50 mm or less. When the difference (D1−D2) is less than the above range, deterioration of the appearance resulting from the deformation of the dimple 16 caused by grinding becomes remarkable. In this respect, the difference (D1−D2) is more preferably equal to or greater than 0.02 mm, and particularly preferably equal to or greater than 0.03 mm. When the difference (D1−D2) is beyond the above range, the appearance may become unsatisfactory due to the size in the meridional direction being greater than the size in the latitudinal direction also after the grinding. In this respect, it is preferred that the difference (D1−D2) is more equal to or less than 0.40 mm, still more equal to or less than 0.35 mm, yet more equal to or less than 0.30 mm, and particularly equal to or less than 0.20 mm.

There may be a case in which a mold 20 with the parting line 30 having an uneven shape is used. Also in such a case, deterioration of the appearance due to grinding can be prevented through providing in the vicinity of the equatorial line E with dimples 16 having the size in the meridional direction being greater than the size in the latitudinal direction in the stage prior to the grinding.

Figure 6:
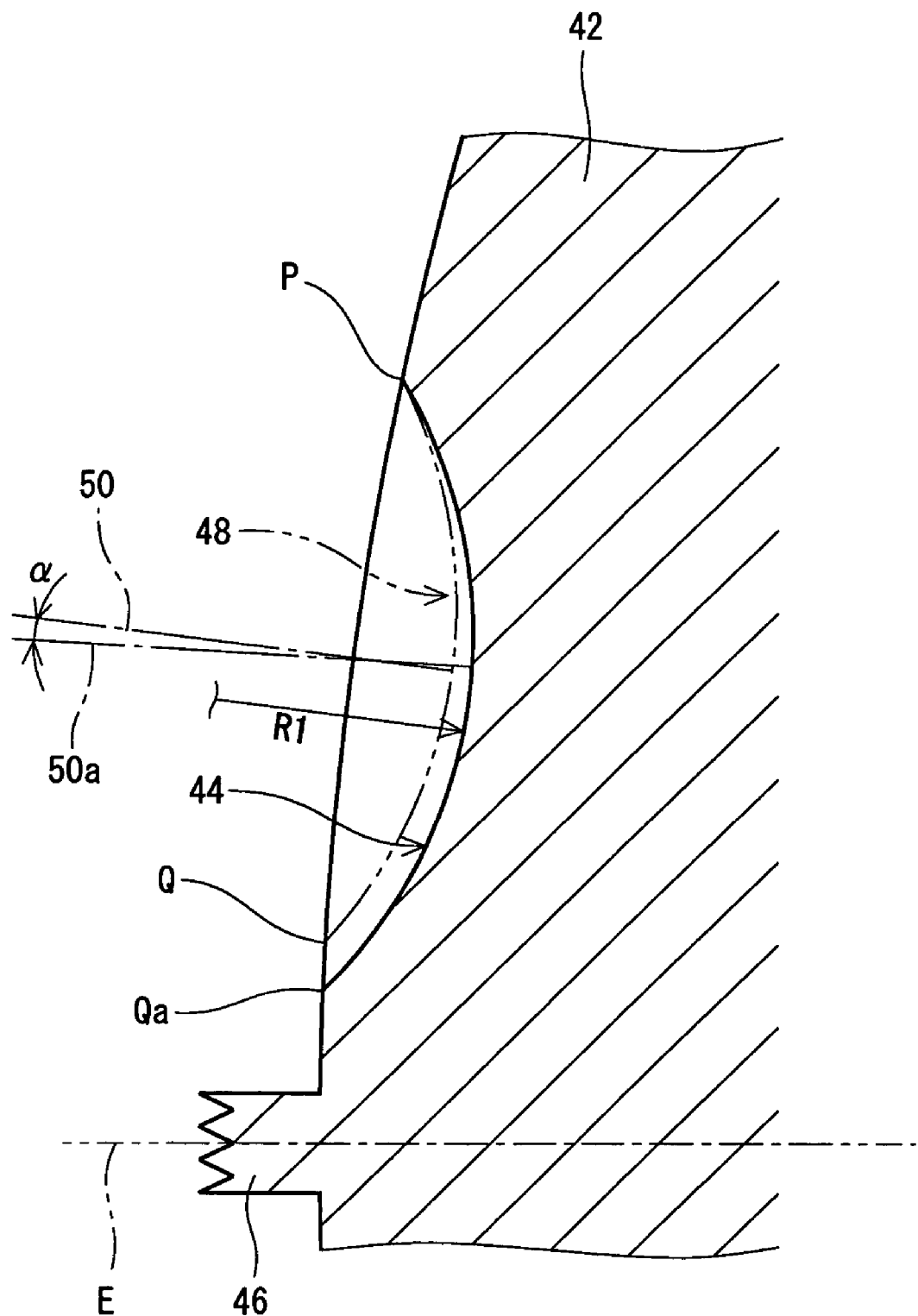
FIG. 6 is a cross sectional view illustrating a part of a ball body in the method of the production according another embodiment of the present invention.

FIG. 6 is a cross sectional view illustrating a part of a ball body 42 in the method of the production according another embodiment of the present invention. In this FIG. 6, an equatorial line E, a dimple 44 in the vicinity of this equatorial line E, and a flash 46 are depicted. This dimple 44 has a cross sectional shape of a simple circular arc. This circular arc has a curvature radius of R1. This dimple 44 is what is called a single radius dimple.

This dimple 44 has a shape provided by rotating a conventional dimple 48 (indicated by a chain double-dashed line) around the uppermost point P having the highest latitude as a center of the rotation, and extending the circular arc to have the same curvature radius as R1. Direction of the rotation is a direction resulting in reduced inclination of the line of the in-depth direction 50 to the equatorial line E. The line of the in-depth direction after the rotation 50a inclines toward the line of the in-depth direction 50 prior to the rotation (also being a normal line of the ball body 42). The angle of inclination is α. According to the rotation, the lowermost end Q of the dimple shifts to the point Qa. The dimple 44 provided by the rotation has a greater size in the meridional direction in comparison with that in the conventional dimple 48. This dimple 44 has the size in the meridional direction being greater than the size in the latitudinal direction. This dimple 44 is vertically long.

Upon grinding/removing of the flash 46, the ball body 42 in the vicinity of the equatorial line E is also cut away. Similarly to the cases shown in FIG. 3 and FIG. 4, the edge on the side of the equatorial line E of the dimple 44 shifts according to the grinding. The shift results in reduction of the size in the meridional direction. Because the dimple 44 prior to the grinding is vertically long as described above, plane shape of the dimple 44 becomes closer to a perfect circle through reducing the size in the meridional direction. The golf ball obtained from this ball body 42 is excellent in appearance.

Figure 7:
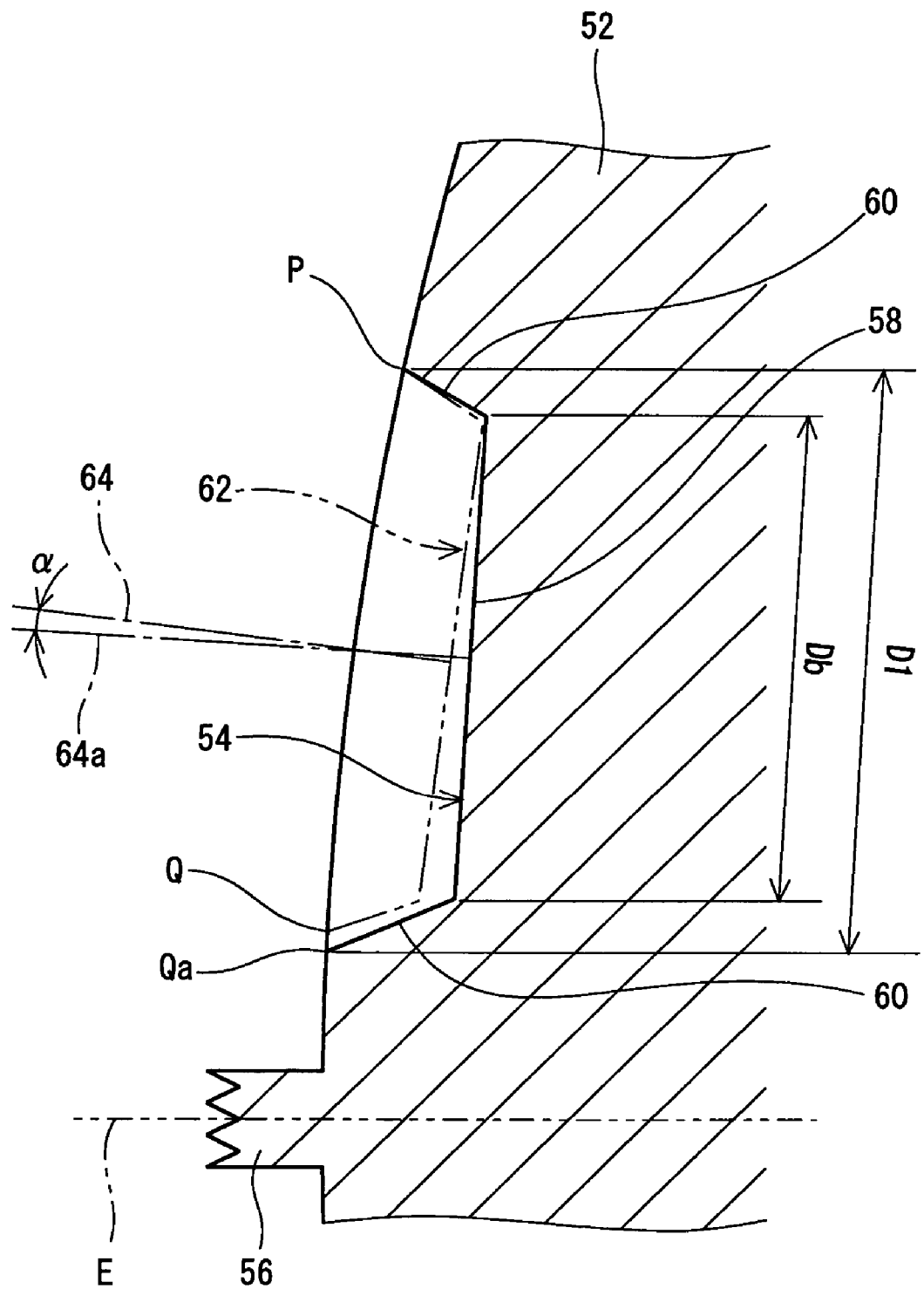
FIG. 7 is a cross sectional view illustrating a part of a ball body in the method of the production according still another embodiment of the present invention.

FIG. 7 is a cross sectional view illustrating a part of a ball body 52 in the method of the production according still another embodiment of the present invention. In this FIG. 7, an equatorial line E, a dimple 54 in the vicinity of this equatorial line E, and a flash 56 are depicted. Although not shown in FIG. 7, this dimple 54 has a cross sectional shape of hexagonal. This dimple 54 has a flat bottom face 58 and a side wall 60. What is indicated by a both-sided arrowhead D1 in FIG. 7 is a size in the meridional direction, whilst what is indicated by a both-sided arrowhead Lb is a size in the meridional direction of the bottom face 58.

This dimple has a shape provided by rotating a conventional hexagonal dimple 62 (indicated by a chain double-dashed line) around the uppermost point P having the highest latitude as a center of the rotation, and extending the side wall 60. Direction of the rotation is a direction resulting in reduced inclination of the line of the in-depth direction 64 (a line that orthogonally crosses with the bottom face at the center of the bottom face) to the equatorial line E. The line of the in-depth direction after the rotation 64a inclines toward the line of the in-depth direction prior to the rotation 64 (also being a normal line of the ball body). The angle of inclination is α. According to the rotation, the lowermost end Q of the dimple shifts to the point Qa. The dimple 54 provided by the rotation has a greater size in the meridional direction in comparison with that in the conventional dimple 62. This dimple 54 has the size in the meridional direction being greater than the size in the latitudinal direction. This dimple 54 is vertically long.

Upon grinding/removing of the flash 56, the ball body 52 in the vicinity of the equatorial line E is also cut away. The edge on the side of the equatorial line E of the dimple 54 shifts from the position indicated by a double-dashed line to the position indicated by a solid line according to the grinding. In other words, grinding results in reduction of the size in the meridional direction. Because the dimple 54 prior to the grinding is vertically long as described above, plane shape of the dimple 54 becomes closer to a regular hexagon through reducing the size in the meridional direction. The golf ball obtained from this ball body 52 is excellent in appearance.

Figure 8:
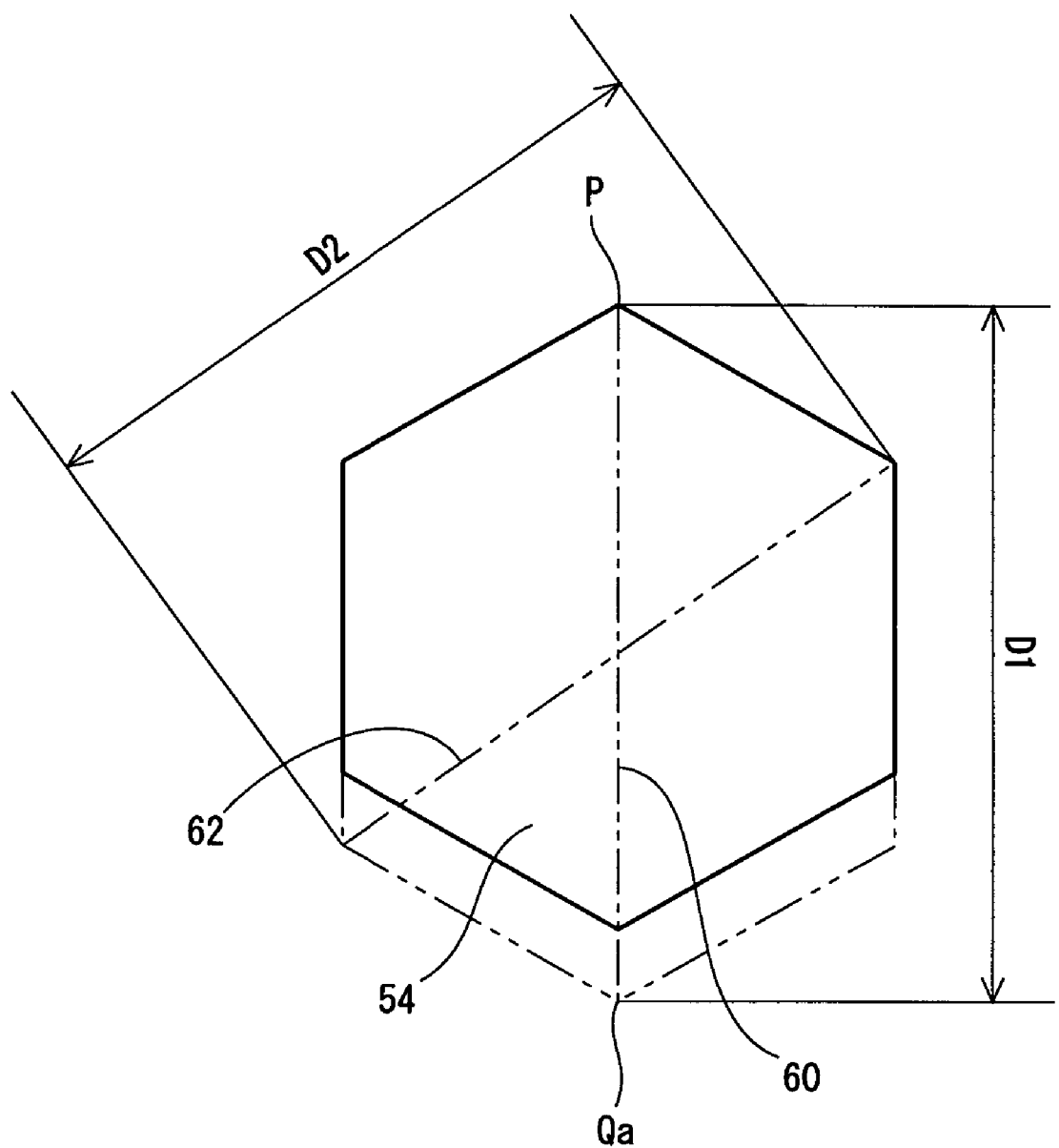
FIG. 8 is a front view illustrating a dimple of a golf ball obtained from the ball body shown in FIG. 7.
Figure 9:
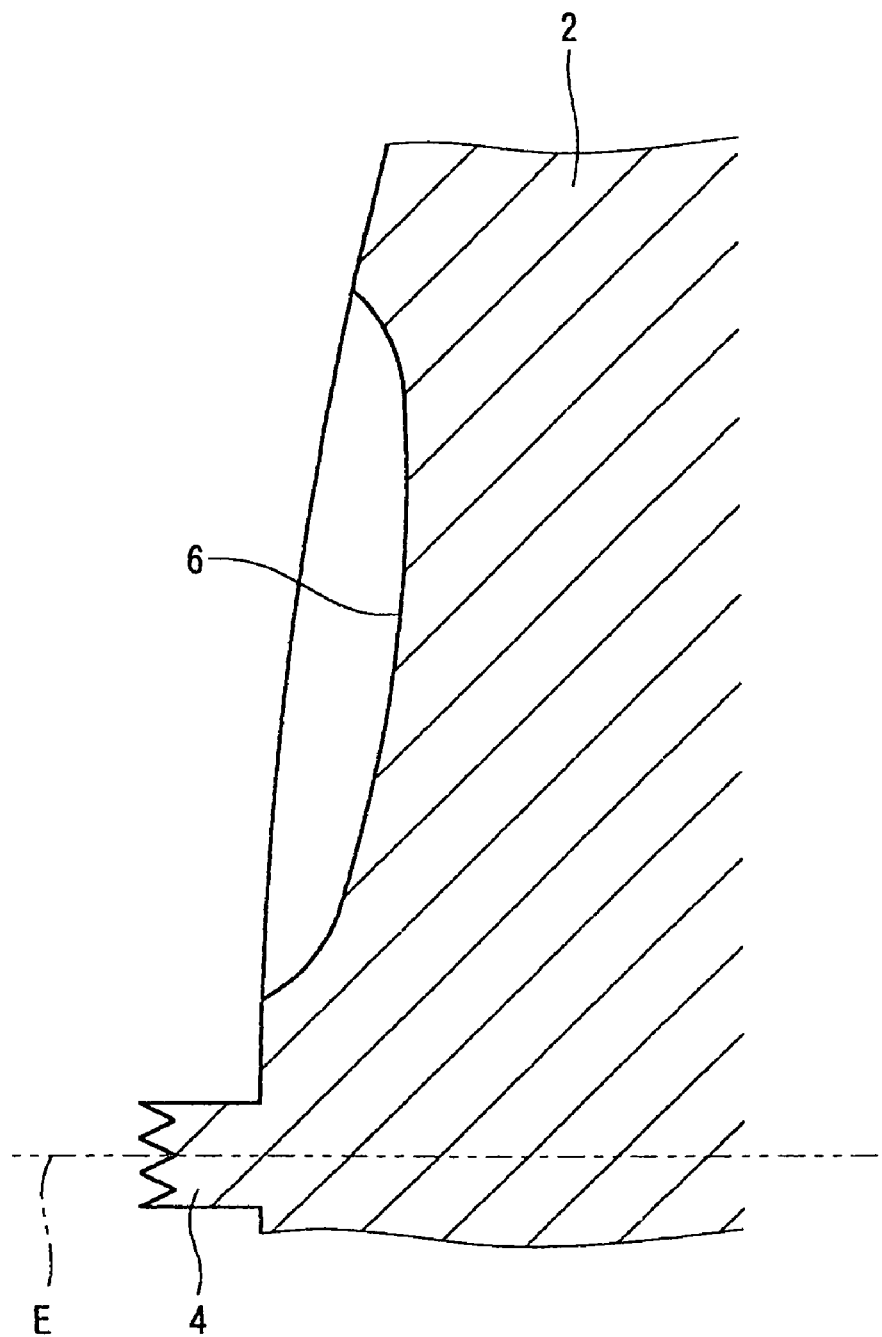
FIG. 9 is a cross sectional view illustrating a part of a ball body in a conventional method of the production.

In instances of non-circular dimples, a line segment 62 is determined which is geometrically equivalent to the line segment in the meridional direction 60, and which has a least angle of inclination to the latitudinal, as shown in FIG. 8. The length of this line segment 62 is referred to as the size in the latitudinal direction D2. Also in instances of the non-circular dimples, the difference between the size in the meridional direction D1 and the size in the latitudinal direction D2 (D1−D2) is preferably 0.01 mm or greater and 0.50 mm or less.

Shape of the dimple after grinding maybe triangular, quadrangular, pentagonal, elliptical, oval, egg-shaped or the like.

EXAMPLES

Example 1

A mold having upper and lower mold half each having a hemispherical cavity and 8 pimples was provided. To this mold was placed a spherical core followed by injection of a molten resin between this core and the cavity face to form a cover. On behalf of the pimples, dimples having the specifications as presented in Table 1 below were formed. A flash generated on the seam of thus resulting ball body was cut away with a sand belt. Paint was applied on this ball body to give a golf ball.

Examples 2 to 10 and Comparative Example 1

In a similar manner to Example 1 except that the mold was changed, a golf ball was obtained. Specifications of the dimples prior to grinding are presented in Table 1 below.

[Observation of Appearance]

The golf balls were visually observed, and subjected to ranking into four grades of from A to D.

TABLE 1

Results of evaluation

|  | Example 1 | Example 2 | Example 3 | Example 4 | Example 5 | Example 6 | Example 7 | Example 8 | Example 9 | Example 10 | Comp. Example 1 |
|---|---|---|---|---|---|---|---|---|---|---|---|
| Plane shape | Circular | Circular | Circular | Circular | Circular | Circular | Hexagonal | Circular | Circular | Circular | Circular |
| Cross sectional shape | DR | SR | SR | DR | SR | SR | — | DR | SR | DR | DR |
| Curvature radius R1 (mm) | 55 | 52 | 42 | 40 | 5 | 28 | — | 41 | 52 | 40 | 55 |
| Curvature radius R2 (mm) | 1 | — | — | 5 | — | — | — | 5 | — | 5 | 1 |
| Angle of inclination α (degree) | 0.8 | 0.5 | 0.7 | 0.5 | 0.2 | 1.1 | 0.6 | 0.5 | 0.1 | 2.2 | 0.0 |
| Size in the meridional direction D1 (mm) | 5.84 | 5.20 | 5.12 | 4.52 | 2.02 | 4.56 | 5.92 | 4.52 | 5.04 | 5.10 | 5.50 |

TABLE 1-continued

Results of evaluation

|  | Example 1 | Example 2 | Example 3 | Example 4 | Example 5 | Example 6 | Example 7 | Example 8 | Example 9 | Example 10 | Comp. Example 1 |
|---|---|---|---|---|---|---|---|---|---|---|---|
| Size in the latitudinal direction D2 (mm) | 5.50 | 5.00 | 4.85 | 4.35 | 2.00 | 4.20 | 5.50 | 4.35 | 5.00 | 4.35 | 5.50 |
| D1–D2 (mm) | 0.34 | 0.20 | 0.27 | 0.17 | 0.02 | 0.36 | 0.42 | 0.17 | 0.04 | 0.75 | 0.00 |
| Latitude (degree) | 5.35 | 9.45 | 7.50 | 3.30 | 1.00 | 7.00 | 10.00 | 6.00 | 9.45 | 3.30 | 5.35 |
| Evaluation | A | A | A | A | B | B | B | A | C | C | D |

SR: Single radius
DR: Double radius

As is shown in Table 1, the appearance of the golf balls of Examples is more favorable than the appearance of the golf ball of Comparative Example. Accordingly, advantages of the present invention are clearly indicated by these results of evaluation.

According to the method of the production of a golf ball of the present invention, a golf ball that is excellent in appearance can be obtained. This method of the production can contribute to the improvement of quality and productivity of golf balls.

The description herein above is merely for illustrative examples, and therefore, various modifications can be made without departing from the principles of the present invention.

What is claimed is:

1. A method of the production of a golf ball which comprises: a molding step in which a precursor ball body having dimples with a size in the meridional direction being greater than a size in the latitudinal direction, in the vicinity of the equatorial line, is formed with a mold; and a removing step in which a flash generated on a seam resulting from the mold is removed along with reduction of a size in the meridional direction of the dimple through grinding the vicinity of the equatorial line whereby a planar shape of the dimple is caused to become a substantially perfect circle or substantially a regular hexagon, thereby producing said golf ball, wherein the dimples of said precursor golf ball obtained by said molding step have a shape in which the in-depth direction is different from the normal direction of the dimples of said golf ball, and wherein an angle of inclination of the line of the in-depth direction to the normal direction of said golf ball is 0.2° or greater and 2.0° or less.

2. The method of the production according to claim 1 wherein the difference between the size in the meridional direction and the size in the latitudinal direction in the dimples obtained in said molding step is 0.01 mm or greater and 0.50 mm or less.

* * * * *